United States Patent [19]

Kuboto et al.

[11] 4,325,582
[45] Apr. 20, 1982

[54] HYDRAULIC PRESSURE CONTROL VALVE ASSEMBLY FOR AUTOMOTIVE HYDRAULIC BRAKE SYSTEM

[75] Inventors: Hitoshi Kuboto; Kazuaki Shimizu, both of Fujisawa, Japan

[73] Assignee: Nissan Motor Company, Limited, Yokohama, Japan

[21] Appl. No.: 33,348

[22] Filed: Apr. 26, 1979

[30] Foreign Application Priority Data

Apr. 28, 1978 [JP] Japan .................................. 53/51041

[51] Int. Cl.³ ............... B60T 8/14; 303 24 C;24 F;6 C
[52] U.S. Cl. ................................... 303/24 F; 303/6 C
[58] Field of Search .......................................... 188/349

[56] References Cited

U.S. PATENT DOCUMENTS 3,163,473 12/1964 Stelzer .......................... 303/24 F X
4,133,584 1/1979 Ohta et al. ........................ 303/24 C

FOREIGN PATENT DOCUMENTS 2350551 4/1974 Fed. Rep. of Germany .

*Primary Examiner*—Duane A. Reger
*Attorney, Agent, or Firm*—Schwartz, Jeffery, Schwaab, Mack, Blumenthal & Koch

[57] ABSTRACT

A hydraulic pressure control valve assembly for a hydraulic brake system for a wheeled vehicle, comprises a proportioning valve having a plunger which is axially movable in a direction against a spring in response to application of a hydraulic pressure to a fluid inlet port to control the magnitude of hydraulic pressure in a fluid outlet port, and a deceleration sensing valve responsive to a deceleration of the vehicle the degree of which exceeds a predetermined value. The deceleration sensing valve has a piston which supports an end of the spring and is sealingly disposed in a chamber to define a sealed expandable chamber which is communicable with the fluid inlet port to enable the expandable chamber to contain a fluid the pressure of which is changeable in accordance with the degree of the deceleration of the vehicle. Biasing means is arranged in the valve assembly to bias the plunger to move axially in the other direction when the magnitude of hydraulic pressure in the sealed expandable chamber exceeds a predetermined value causing the piston to move toward the plunger beyond a predetermined distance against the spring.

7 Claims, 4 Drawing Figures

HYDRAULIC PRESSURE CONTROL VALVE ASSEMBLY FOR AUTOMOTIVE HYDRAULIC BRAKE SYSTEM

FIELD OF THE INVENTION

The present invention relates in general to an antiskid braking system for a wheeled motor vehicle, and more particularly to a hydraulic pressure control valve which limits the rise of hydraulic pressure in the outlet thereof leading to rear wheel brake cylinders irrespective of the rise of pressure in the inlet thereof leading to a master cylinder of the system.

BACKGROUND OF THE INVENTION

In a hydraulically operated braking system for wheeled motor vehicles, wherein front and rear wheels are braked simultaneously, if the rear wheels are locked first, the vehicle is likely to show rear end skid or "yaw." In fact, such locking is far more dangerous than if the the front wheels are locked first. In view of the fact that upon braking during forward cruising, the effective weight transfer of the vehicle occurs reducing the load on the rear wheels thereby causing the rear wheels to lock easier than the front wheels, a hydraulic pressure control valve is usually provided in a rear wheel braking hydraulic line for limiting the rise of hydraulic pressure exerted in the hydraulic line leading to the rear wheel brake cylinders, with respect to the rise of pressure in the line leading to the front wheel brake cylinders.

As a hydraulic pressure control valve of the kind referred to, a proportioning valve (which will be referred to as "P-valve" hereinafter) has been proposed. In the P-valve, the pressure value when beginning to limit the rise of the rear wheel braking hydraulic pressure, that is, the critical hydraulic pressure, is constant thereby to make the front and rear wheels brake pressure distribution characteristic constant.

As is known, however, an ideal distribution characteristic for locking (not braking) the front and rear wheels simultaneously is one that varies with the change in the vehicle weight. More specifically, the ideal characteristic is such that the critical hydraulic pressure becomes higher as the vehicle weight increases. Thus, the P-valve is inapplicable to trucks and the like the weight of which varies greatly depending on whether they are empty or loaded.

In view of the above, there has been proposed a hydraulic pressure control valve assembly which comprises a combination of the P-valve and a deceleration sensing valve (which will be referred to as G-valve hereinafter), which detects any deceleration of a vehicle and operates to raise the critical hydraulic pressure in proportion to the increase of the vehicle weight.

With a hydraulic pressure control valve assembly of such a structure, however, when the load is maximum or when the front wheel braking system fails to operate, sufficient critical hydraulic pressure cannot be produced, so that the braking force for the vehicle becomes insufficient. In order to solve this problem, some expedients are put into practical use; for example, increasing the setting load of the spring which acts on a plunger member of the P-valve, increasing the installation slanting angle of the hydraulic pressure control valve with respect to the horizontal, or increasing the spring constant of the said spring. Two former ways, though of achieving the object, result in the critical hydraulic pressure at the time when vehicle is empty or lightly loaded becoming too high causing the front and rear wheels brake pressure distribution characteristic to be outside the ideal range, thereby causing the rear wheels to lock at such time. The third way results in not only the critical hydraulic pressure becoming too high around the time when the vehicle is half loaded resulting in the front and rear wheels brake pressure distribution characteristic being outside the ideal range, thereby causing the rear wheels to lock at such time, but also that the stress applied to the plunger member of the P-valve considerably increases thereby causing a durability problem and enlargement of the spring, and also of the hydraulic pressure control valve assembly, itself.

OBJECTS OF THE INVENTION

Therefore, an essential object of the present invention is to provide a hydraulic pressure control valve assembly which is free of the above-mentioned defects.

BRIEF DESCRIPTION OF THE DRAWINGS

Other objects and advantages of the present invention will become apparent from the following description when taken in conjunction with the accompanying drawings, in which.

DESCRIPTION OF THE PREFERRED EMBODIMENT

Figure 1:
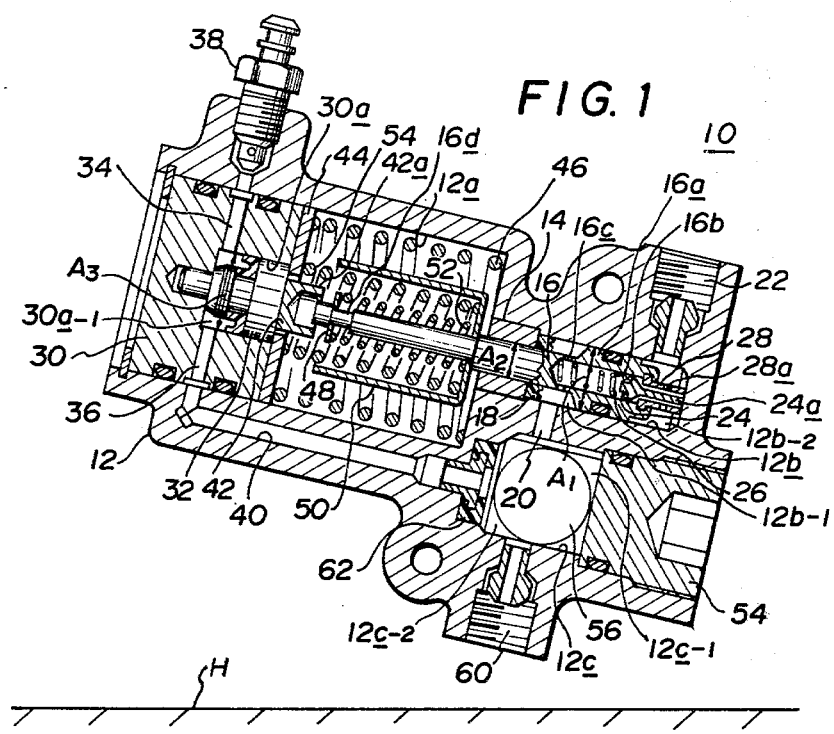
FIG. 1 is a vertical section view of a hydraulic pressure control valve assembly according to the present invention.

Referring to FIG. 1 of the drawings, there is illustrated a hydraulic pressure control valve assembly according to the present invention, which is generally designated by the numeral 10. The assembly 10 comprises a body 12 having therein a cylindrical chamber 12a of larger diameter, a blind cylindrical chamber 12b of smaller diameter aligned and communicating with the chamber 12a, and another cylindrical chamber 12c arranged parallel to the blind chamber 12b. Screwed to the open end of the blind chamber 12b is an annular guide member 14 which slidably supports a plunger 16 coaxially received in a space consisting of the chambers 12a and 12c so that the plunger 16 is axially movable in the space. The plunger 16 is formed at a section thereof positioned in the blind chamber 12b with a land 16a. The land 16a is sealingly and slidably engaged with the cylindrical wall of the blind chamber 12b and divides the chamber 12b into first and second sections 12b-1 and 12b-2, as shown. The section 12b-1 is isolated from the chamber 12a by an annular sealing member 18 attached to the annular guide member 14, but communicates with the chamber 12c through a passage 20 formed in the body 12. The section 12b-2 communicates with a fluid outlet port 22 also formed in the body 12.

The plunger 16 is formed at its right hand end, as seen in the drawing, with an axially extending blind hole 16b which opens toward the second section 12b-2 of the blind chamber 12b. In the blind hole 16b is arranged a poppet valve 24 which is biased to move rightwardly by means of a pre-loaded spring 26 set in the blind hole 16b. A sleeve or cylindrical valve seat 28 is fixed to and projected rightwardly from the entrance of the blind hole 16b, upon which the poppet valve 24 bears to seal the blind hole 16b. The valve seat 28 is formed at the cylindrical wall thereof with openings 28a which provide constant communication between the interior of the valve seat 28 and the blind chamber 12b. A valve stem 24a of the poppet valve 24 is so constructed and sized in length that it projects slightly toward the bottom wall of the blind chamber 12b from the right open end of the valve seat 28 when the poppet valve 24 contacts the valve seat 28 to close. The blind hole 16b constantly communicates with the first section 12b-1 of the blind chamber 12b through openings 16c formed in the plunger 16 near the bottom of the blind hole 16b. Thus, it will be appreciated that when the right hand open end of the valve seat 28 is brought into contact with the bottom wall of the blind chamber 12b, the poppet valve 24 opens so that communication between the second section 12b-2 and the first section 12b-1 becomes established through the openings 28a, the blind hole 16b and the openings 16c.

The left hand end of the cylindrical chamber 12a is closed by a sealing plug 30 which is formed with a blind hole 30a opening to the chamber 12a. A piston 32 is sealingly and slidably disposed in the blind hole 30a to define between the piston 32 and the bottom of the hole 30a an operating chamber 30a-1. Two passages 34 and 36 communicating with the operating chamber 30a-1 are formed in the sealing lid 30 to extend radially outwardly from the chamber 30a-1. An air bleed valve 38 is screwed to the body 12 to communicate with the passage 34. A passage 40 connecting the passage 36 with the chamber 12c is formed in the body 12.

A spring seat catcher 42 in the form of a cup is secured to the flat end of the piston 32 so as to move with the piston 32 along the axis of same. As is shown in the drawing, the catcher 42 has a blind bore (no numeral) facing the plunger 16 leaving a wall end 42a. A spring seat 44 with a central opening (no numeral) is also fixed to the piston 32 in a manner to receive the catcher 42 in the central opening. The spring seat 44 is in the form of a disc and is loosely disposed in the chamber 12a to move with the piston 32. A spring 46 is arranged and compressed between the spring seat 44 and the bottom wall of the chamber 12a to bias the spring seat 44 and thus the piston 32 leftwardly in the drawing, that is in the direction to contract the expandable chamber 30a-1.

As shown, the plunger 16 is formed at its left hand end, which is positioned in the chamber 12a, with a reduced diameter section 16d to a given axial length. Axially slidably disposed about the reduced diameter section 16d is a small spring seat 48. The spring seat 48 however is of a size to be engageable with the wall end 42a of the catcher 42 upon rightward movement of the piston 32 beyond a given distance. Another spring seat 50 in the form of a cup is coaxially disposed about the plunger 16 with the bottom wall secured to the generally middle section of the plunger 16 located in the chamber 12a. A spring 52 is arranged and compressed between the spring seat 48 and the bottom wall of the cup-shaped spring seat 50, while a spring 54 is between the spring seat 44 and the bottom wall of the seat 50.

The right hand end of the chamber 12c is sealed with a plug 54. Within the chamber 12c is slidably movably received a ball 56 which thus divides the chamber 12c into first and second sections 12c-1 and 12c-2. These sections communicate constantly with each other by an axially extending groove 58 formed in the cylindrical wall of the chamber 12c. A fluid inlet port 60 communicating with the second section 12c-2 of the chamber 12c is formed in the body 12. A valve seat 62 is fixed to the right hand open end of the passage 40, on which the ball 56 is to sit when shutting the passage 40.

In the above-mentioned hydraulic pressure control valve assembly 10 of the invention, the plunger 16, the poppet valve 24, the valve seat 28, the spring 26, and the springs 52 and 54 constitute a P-valve, whereas the piston 32, the ball 56, and the valve seat 62 constitute a G-valve. When this assembly 10 is mounted on the vehicle body, it is so slanted with respect to the horizontal plane "H" that under normal state of the assembly, the ball 56 will be in contact with the plug 54 by its own gravity, as shown in FIG. 1, in particular, it is slanted with an angle "$\theta$" with respect to the horizontal plane "H" as shown in FIG. 2.

Figure 2:
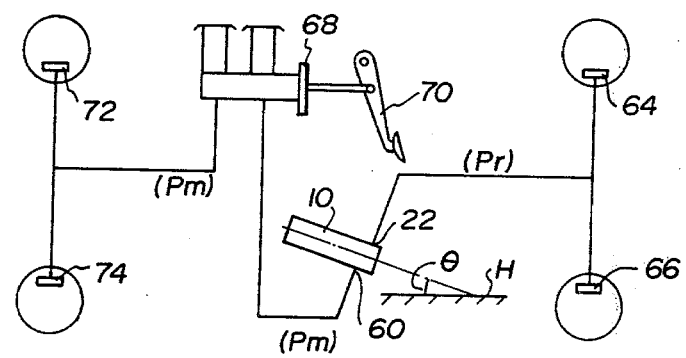
FIG. 2 is a diagram depicting the positioning of the valve assembly in the automotive hydraulic braking system.

As shown in FIG. 2, in actual use, the outlet port 22 of the assembly 10 is connected to brake cylinders 64 and 66 of right and left rear wheels (no numerals), and the inlet port 60 is connected to one of outlet ports of a master cylinder 68. Designated by numeral 70 is a brake pedal. The other of the outlet ports of the master cylinder 68 is connected to brake cylinders 72 and 74 of right and left front wheels (no numerals). The brakes for the wheels may be of a type of disc brake or a drum brake.

The operation of the hydraulic pressure control valve assembly 10 of the invention is as follows:

Usually, the assembly 10 is maintained in the condition, as shown in FIG. 1, wherein the ball 56 is spaced from the valve seat 62 thereby communicating the passage 40 with the chamber 12c, the plunger 16 with the cup-shaped spring seat 50 is maintained spaced farmost from the piston 32 by the springs 46 and 54, the poppet valve 24 opens with the stem 24a pushed leftwardly by the bottom wall of the blind chamber 12b, and the spring seat 44 is pushed against the inner end surface of the sealing lid 30. When the brake pedal 70 is depressed to cause the master cylinder 68 to output a hydraulic pressure $P_m$, the pressure $P_m$ is supplied directly to the front wheel brake cylinders 72 and 74 and also to the rear wheel brake cylinders 64 and 66 through the inlet port 60, the cylindrical chamber 12c, the passage 20, the section 12b-1 of the blind chamber 12b, the openings 16c of the plunger 16, the blind hole 16b of the plunger 16, the interior of the cylindrical valve seat 28, the openings 28a of the valve seat 28, the second section 12b-2 of the blind hole 12b, and the outlet port 22. Therefore, in this condition, the braking hydraulic pressure $P_r$ for rear wheel brake cylinders 64 and 66 is equal to that of the front wheel brake cylinders 72 and 74, more specifically to the master cylinder hydraulic pressure $P_m$, so that the rear wheel braking pressure $P_r$ rises with the characteristic shown by "a-b" in FIG. 3. The balance formula of the force applied to the plunger 16 is presented as follows:

$$P_m \cdot A_2 = F_1 \qquad (1)$$

wherein $A_2$: Inner hole sectioned area of the annular guide member 14, and $F_1$: Force generated by the spring 54.

When the master cylinder hydraulic pressure $P_m$ rises, due to operation of the brake pedal 70, the left term of the above expression becomes larger, thereby moving the plunger 16 leftward in FIG. 1 against the force of the spring 54 and finally moving the plunger 16 to a position to allow the poppet valve 24 to close. The hydraulic pressure at this time, that is, the critical hydraulic pressure $P_s$ is represented by the following equation, corresponding to the above equation wherein $P_m$ is substituted by $P_s$, $$P_s = (F_1/A_2) \tag{2}$$

When the master cylinder hydraulic pressure $P_m$ continues to rise due to the continuous operation of the brake pedal 70, it begins to push the plunger 16 rightward in FIG. 1, with the force $P_m \cdot (A_1 - A_2)$ wherein $A_1$ represents the sectioned area of the blind chamber 12b, and when the poppet valve 24 is opened, the hydraulic pressure is supplied to the outlet port 22 through the valve 24, thereby increasing the rear wheel braking hydraulic pressure $P_r$. When $P_m$ is equal to or greater than $P_s$, that is $P_m \geq P_s$, the balance of the force applied to the plunger 16 is represented by the following equation:

$$P_r A_1 = P_m (A_1 - A_2) + F_1 \tag{3}$$

From the above equation (3), the rear wheel braking hydraulic pressure $P_r$ is derived and represented by the following equation:

$$P_r = \frac{A_1 - A_2}{A_1} \cdot P_m + \frac{F_1}{A_1} = m \cdot P_m + \frac{F_1}{A_1} \tag{4}$$

wherein $$m \ldots (A_1 - A_2)/(A_1)$$

Figure 3:
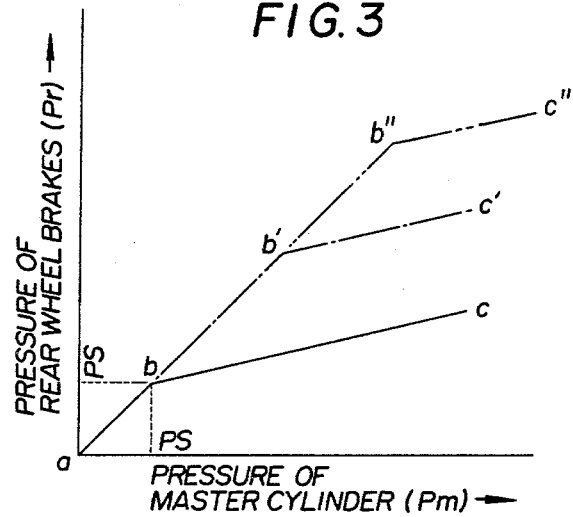
FIG. 3 is a graph depicting the operation characteristic of the valve assembly of the invention.

As is clear from the above equation (4), when the master cylinder hydraulic pressure $P_m$ becomes higher than the critical hydraulic pressure $P_s$, the rear wheel braking hydraulic pressure $P_r$ rises with a smaller slope "m" than the slope "1" of the equation of (2), as shown by "b-c" in FIG. 3, thereby preventing the rear wheels from becoming locked.

On the other hand, when the master cylinder hydraulic pressure $P_m$ rises, the braking force "B" will also rise and the deceleration "$\alpha$," which is obtained by dividing the braking force "B" with the vehicle weight "W," will also rise, as is obvious from the following equations:

$$B = C \cdot P_m \tag{5}$$

wherein C: a constant $$(\alpha/g) = (B/W) \tag{6}$$

wherein g: gravitational acceleration.

When the deceleration ratio "$\alpha/g$" reaches the next-mentioned fixed value which is determined by the sloping angle "$\theta$" ($\theta$ is the inclination angle of the assembly 10 with respect to the horizontal plane "H" as has been mentioned before), $$(\alpha/g)_o = f(\theta) \tag{7}$$

wherein $f(\theta)$: function of $\theta$,
the ball 56 moves by its inertia leftward in FIG. 1 against the component of force of the gravitational acceleration in the direction of the sloping angle $\theta$, and closes the opening of the valve seat 62. Thus, even if the master cylinder hydraulic pressure $P_m$ increases further, the pressure applied to the piston 32 will be maintained at the same as that at the time when the ball 56 closes the opening of the valve seat 62. The pressure $P_G$ inside the first section 30a-1 of the blind hole 30a at this time is represented by the following equation:

$$P_G = \frac{f(\theta)}{C} \cdot W \tag{8}$$

The force for pushing the piston 32 rightward in FIG. 1, which is represented by a product of the hydraulic pressure $P_G$ and the pressure receiving area $A_3$ of the piston 32, will balance with the sum of the forces "$F_1$" and "$F_2$" of the springs 54 and 46 at this time, and the following equation is obtained:

$$F_1 + F_2 = P_G \cdot A_3 = \frac{f(\theta)}{C} \cdot A_3 \cdot W \tag{9}$$

The force $F_1$ acts to push the plunger 16 rightward in FIG. 1, and the force $F_2$ is received by the bottom wall of the chamber 12a.

Since the force $F_1$ is represented by the sum of the set load $f_1$ of the spring 54 and a product of the moved distance $\Delta X$ of the piston 32 and the spring constant $K_1$ of the spring 54, and the force $F_2$ is represented by the sum of the set load $f_2$ of the spring 46 and a product of the moved distance $\Delta X$ of the piston 32 and the spring constant $K_2$ of the spring 46, the following equation is obtained, $$F_2 = f_2 + \frac{K_2}{K_1}(F_1 - f_1) \tag{10}$$

From the equations (9) and (10), the following equation is obtained:

$$F_1 = \frac{\frac{f(\theta)}{C} A_3 W - \left(f_2 - \frac{K_2}{K_1} f_1\right)}{1 + \frac{K_2}{K_1}} \tag{11}$$

When the master cylinder hydraulic pressure $P_m$ is lower than the critical hydraulic pressure $P_s$, that is $P_m < P_s$, the next equation will be obtained by putting the equation (11) into the equation (2):

$$P_s = \frac{\frac{f(\theta)}{C} A_3 W - \left(f_2 - \frac{K_2}{K_1} f_1\right)}{A_2 \left(1 + \frac{K_2}{K_1}\right)} \tag{12}$$

On the other hand, when the master cylinder hydraulic pressure $P_m$ is equal to or higher than the critical hydraulic pressure $P_s$, that is $P_m \geq P_s$, the next equation is obtained by putting the equation (11) into the equation (4):

$$P_r = m \cdot P_m + \frac{F_1}{A_1} \tag{13}$$

$$= m \cdot P_m + \frac{\frac{f(\theta)}{C} A_3 W - \left(f_2 - \frac{K_2}{K_1} f_1\right)}{A_1 \left(1 + \frac{K_2}{K_1}\right)}$$

Figure 4:
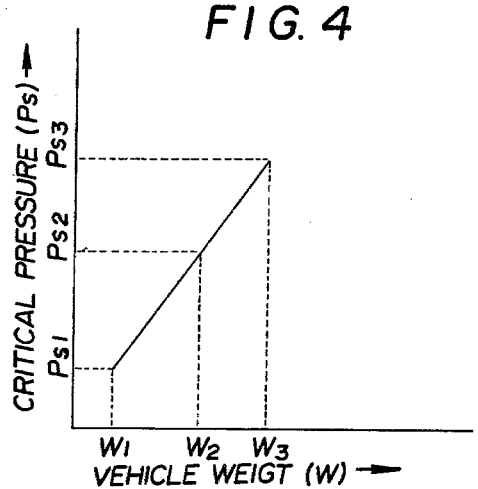
FIG. 4 is a graph depicting the relationship between the vehicle weight and the critical hydraulic pressure.

Thus by choosing the value $(f_2-(K_2/K_1)\cdot f_1)$ to be greater than zero, that is, $(f_2-(K_2/K_1)\cdot f_1)>0$, the relationship between the critical hydraulic pressure $P_s$ and the vehicle weight W is obtained, as is shown in FIG. 4. As is clear from this graph, the critical hydraulic pressure $P_s$ rises with increase of the vehicle weight W.

As is understood from the foregoing, the split point "b," shown in FIG. 3, rises as the load on the vehicle increases. Thus, the rear wheel braking hydraulic pressure $P_r$ will rise, for example, when the vehicle is half loaded, with the characteristic indicated by "a-b'-c'" in FIG. 3, which is substantially the ideal for rear wheel braking hydraulic pressure.

On the other hand, when the vehicle is loaded to its maximum, or the front wheel brakes 72 and 74 fail to operate, the pressure $P_G$ in the section 30a-1 of the chamber 30a becomes great because the brake pedal 70 should be worked with much greater force to obtain a sufficient braking force.

At this time, the pressure $P_G$ in the section 30a-1 moves the piston 32 rightward and to a position to cause the spring seat catcher 42 to contact with and press the spring seat 48 against the spring 52, compressing the spring 52. The force $F_3$ now generated by this spring 52, similarly to the force $F_1$ of the spring 54, is applied to the spring seat 48, and the following equation is obtained by modifying the equation (2), $$P_s = \frac{F_1 + F_3}{A_2} \quad (14)$$

and the aforementioned equation (4) is modified into the following one:

$$P_r = m \cdot P_m + \frac{F_1 + F_3}{A_1} \quad (15)$$

Further, the equation (9) is substituted with the following one:

$$F_1 + F_2 + F_3 = \frac{f(\theta)}{C} A_3 W \quad (16)$$

From this equation (16) and the equation (10), the next equation corresponding to the equation (11) rises:

$$F_1 = \frac{\frac{f(\theta)}{C} A_3 W - \left(f_2 - \frac{K_2}{K_1} f_1\right) - F_3}{1 + \frac{K_2}{K_1}} \quad (17)$$

By putting the equation (17) into the equation (14) upon a condition that is $P_m < P_s$, the following is obtained:

$$P_s = \frac{\frac{f(\theta)}{C} A_3 W - \left(f_2 - \frac{K_2}{K_1} f_1\right) - F_3}{A_2 \left(1 + \frac{K_2}{K_1}\right)} \quad (18)$$

Further by putting the equation (17) into the equation (15) upon a condition that is $P_m \geq P_s$, the next equation is obtained:

$$P_r = m \cdot P_m + \frac{\frac{f(\theta)}{C} A_3 W - \left(f_2 - \frac{K_2}{K_1} f_1\right) - F_3}{A_1 \left(1 + \frac{K_2}{K_1}\right)} \quad (19)$$

On comparing the two equations (19) and (13), it will be appreciated that when the vehicle is loaded to its maximum or the front wheel brake cylinders 72 and 74 fail to operate causing compression of the spring 52, the critical hydraulic pressure $P_s$ rises at a greater rising rate than in a case wherein the vehicle is empty or loaded light, so that the rear wheel braking hydraulic pressure $P_r$ rises with the ideal characteristic shown by a-b"-c" in FIG. 3 permitting the split point b" to have a sufficiently high value.

From the foregoing description, it will be appreciated that according to the hydraulic pressure control valve assembly 10 of the invention, sufficiently high braking force is applied to the rear wheel brakes when a vehicle is loaded to its maximum or the front wheel brakes fail to operate, so that not only the problems originated by insufficiency of the rear wheel braking hydraulic pressure at such occasions are solved, but also the reduction of the operation force applied to the brake pedal by a driver is accomplished.

What is claimed is:

1. A hydraulic pressure control valve assembly for a hydraulic brake system of a wheeled vehicle, the control valve comprising:
    a proportioning valve arranged between a brake master cylinder and a wheel brake cylinder of the rear wheels of the vehicle and provided with a plunger which is axially movable in a first direction against a certain spring in response to a hydraulic pressure applied to an inlet port to control the magnitude of the hydraulic pressure at an outlet port;
    a deceleration sensing valve which responds when the deceleration of the vehicle exceeds a predetermined value and which is associated with a piston sealingly and slideably disposed in a chamber to define a working chamber which communicates with said inlet port, said piston supporting one end of said certain spring and said working chamber being isolated from said inlet port when the deceleration of the vehicle exceeds the predetermined value;
    means, including a pre-loaded spring, for rendering said pre-loaded spring effective to act on said plunger in a direction opposite to said first direction when the pressure acting on the piston exceeds a predetermined value and thus moves said piston beyond a predetermined distance against the force of said certain spring.

2. A hydraulic pressure control valve assembly as claimed in claim 1 in which said pre-loaded spring comprises a spring other than said certain spring disposed about said plunger and having one end seated on a seat secured to said plunger; a movable spring seat loosely disposed about said plunger so as to be axially movable within a given distance of said plunger, said movable spring seat supporting the other end of said other spring in a manner to be biased toward said piston; and a catch member provided on said piston, said catch member being adapted to be brought into contact with said movable spring seat to further compress said other spring when the piston moves towards the plunger beyond a predetermined distance.

3. A hydraulic pressure control valve assembly as claimed in claim 2 in which said catch member is formed with a blind hole into which one end of said plunger is insertable upon contact of a portion of said catch member with said movable spring seat.

4. A hydraulic pressure control valve assembly as claimed in claim 2 in which said movable spring seat is loosely disposed about a reduced diameter section of said plunger, said reduced diameter section having a given axial length.

5. A hydraulic pressure control valve assembly as claimed in claim 2 in which said seat secured to said plunger is a common seat on which the other end of said certain spring is seated.

6. A hydraulic pressure control valve assembly for a hydraulic brake system for a wheeled vehicle comprising:

a proportioning valve having a plunger which is axially movable in a direction against a certain spring in response to application of a hydraulic pressure to a fluid inlet port to control the magnitude of hydraulic pressure in a fluid outlet port;

a deceleration sensing valve responsive to a deceleration of said vehicle, the degree of which exceeds a predetermined value, said deceleration sensing valve having a piston which supports an end of said certain spring and is sealingly disposed in a chamber to define a sealed expandable chamber which is communicable with said fluid inlet port to enable said expandable chamber to contain a fluid the pressure of which is changeable in accordance with the degree of the deceleration of said vehicle; and biasing means which functions to bias said plunger to move axially in the other direction when the magnitude of hydraulic pressure in said sealed expandable chamber exceeds a predetermined value causing said piston to move toward said plunger beyond a predetermined distance against said spring, said biasing means comprising a spring other than said certain spring having one end seated on a seat secured to said plunger; a movable spring seat loosely disposed about said plunger to be movable axially within a given section of said plunger, the other end of said other spring being seated on said movable spring seat to bias the same toward said piston; and a catcher fixed to said piston, said catcher being brought into contact with said movable spring seat to compress said spring when said piston moves toward said plunger beyond a predetermined distance.

7. A hydraulic pressure control valve assembly as claimed in claim 6 in which said catcher has a blind bore into which an end of said plunger is insertable upon contact of a section of said catcher with said movable spring seat.

* * * * *

UNITED STATES PATENT AND TRADEMARK OFFICE
CERTIFICATE OF CORRECTION

PATENT NO. : 4,325,582
DATED : April 20, 1982
INVENTOR(S) : KUBOTA, ET AL.

It is certified that error appears in the above—identified patent and that said Letters Patent is hereby corrected as shown below:

In the cover page, column 1, item 75 (Inventors), line 1, delete "Kuboto" and insert therefor -- Kubota --.

On the cover page in item (19), "Kuboto et al" should read -- Kubota et al --.

Signed and Sealed this

Third Day of August 1982

[SEAL]

Attest:

Attesting Officer

GERALD J. MOSSINGHOFF

Commissioner of Patents and Trademarks